F. RYBÁŘ.
BELT FASTENING MACHINE.
APPLICATION FILED MAR. 30, 1910.
967,677.
Patented Aug. 16, 1910.
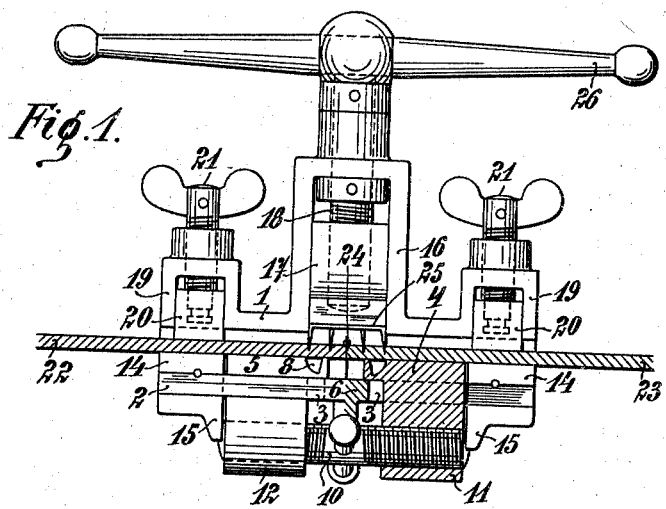
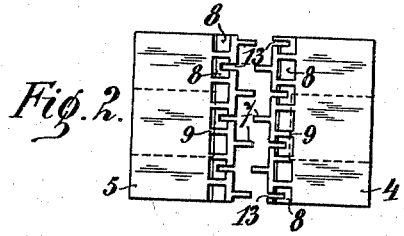
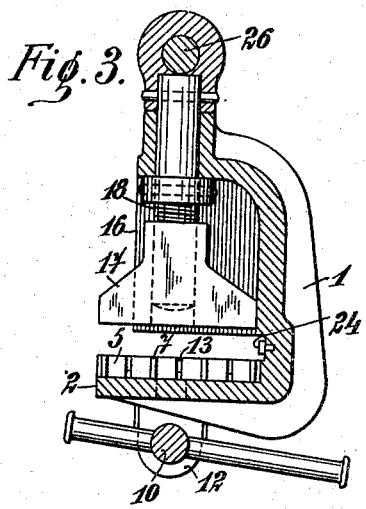
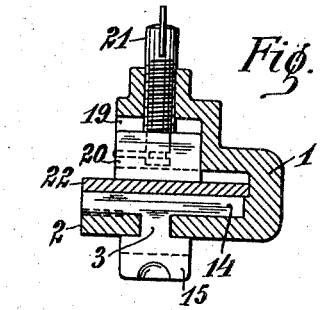
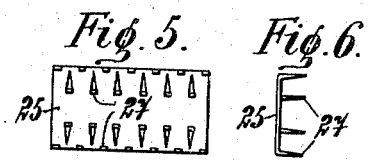
WITNESSES
W. Zeaman
M. E. Gray
INVENTOR
F. Rybář
BY
[signature]
ATTORNEY
THE NORRIS PETERS CO., WASHINGTON, D. C.

UNITED STATES PATENT OFFICE.

FRANTIŠEK RYBÁŘ, OF RANSKO, AUSTRIA-HUNGARY.

BELT-FASTENING MACHINE.

967,677.  Specification of Letters Patent. Patented Aug. 16, 1910.

Application filed March 30, 1910. Serial No. 552,437.

*To all whom it may concern:*

Be it known that I, FRANTIŠEK RYBÁŘ, a subject of the Emperor of Austria-Hungary, residing at Ransko, in the Kingdom of Bohemia, Austrian Empire, have invented a new and useful Belt-Fastening Machine, of which the following is a specification.

My invention relates to improvements in belt - fasteners in which hooks with their sharp perpendicular teeth are pressed through both the ends of belts to be joined together, the teeth to be pressed through the belt-ends and on their other side to be bent and clenched into the belt-surface; and the object of my improvement is to obtain a more durable, regular and pliable belt-joint independently of the cleverness and ability of the workmen. I attain this object by the mechanism illustrated in the accompanying drawing, in which—

Figure 1 is a vertical view and partly sectional of my belt-fastening machine; Fig. 2 a top view of the matrices; Fig. 3 a vertical section through the axis of the press-screw; Fig. 4 a vertical section through the axis of one of the clamping screws; Fig. 5 and Fig. 6 the hook in two views.

Similar letters refer to similar parts throughout the several views.

The frame 1 of the machine and its table 2 form one solid piece. The table has a longitudinal slit 3 with a bridge 6 in its center. Slit 3 serves as guide for the two matrices 4 and 5, each of which is provided with a nut 11 and 12 under the table 2. One of the nuts 11 and 12 has a right hand thread and the other a left hand thread for a screw 10, which is common to both of them. The upper surfaces of the matrices 4 and 5 are situated in one and the same plane, and in turning the screw 10 in one or the opposite direction the two matrices 4 and 5 can be either closed together or drawn more or less apart from each other. Their course is limited by the pieces 14—15, which are fixed on both sides of the table 2 into the frame and fill up the ends of the slit 3. Their upper surfaces form one plane with the upper surfaces of the matrices 4 and 5; and beneath the table 2 said pieces 14—15 are extended over the ends of the screw 10 for the purpose of keeping it in place. The inside edges of the matrices 4 and 5 are provided with teeth 7 and grooves 13 on one and the other side opposite to each other, so as to gear in each other when the matrices are closed. Next to their inside edges the matrices 4 and 5 are provided each with a series of open cavities 8, which have concave surfaces and partitions 9 between them. As shown in the drawings, said matrices 4 and 5 with their cavities 8, partitions 9, inside edges and their teeth 7 and grooves 13 must correspond with the hook 25 and its teeth, as will be explained farther on.

The machine is provided in its center with a press-prop 17 sliding vertically between two walls 16 of the frame and having a screw 18 and handle 26 or another appropriate device for pressing it down and lifting it up. The base of the prop 17 covers exactly the surface of the hook 25, which fits between the two guiding walls 16, 16, so that it can be easily inserted between them under the prop 17. This hook is made with four series of teeth, two of them being formed on the edges of the hook and the two other series at a certain distance from the edges, as shown in Fig. 5. The distribution of the teeth upon the hook 25 and the named parts 8, 9, 7, and 13 upon the matrices 4 and 5 is shown in Figs. 1 and 2, where the two matrices 4 and 5 are represented farthest from each other and the hook 25 under the press-prop 17, so that its teeth project against the cavities 8 and just before the inner edges of the matrices. It will be seen that the edge-series of teeth project against the edges of the concave cavities 8, and the inner series of teeth just in front of the inner edges of the two matrices, the distribution of the teeth 7, grooves 13, and walls 9 being such as not to collide with the teeth of the hook 25, when this hook shall have been pressed down, as shown in Fig. 1. Two other props 20, 20 are placed at both sides of the frame 1 and are guided vertically between the walls 19, 19 of the frame, said props 20, 20 having screws 21, 21 and means for pressing them down against the pieces 14, 14, or equivalent clamping devices, to hold the belt 22, 23 fast in its place. In working the device, both the ends 22 and 23 are laid on the upper surface of 14, 4, 5, 14 till they touch the pin 24, which marks the center of the machine, and which is fastened inside the frame closely above the matrices 4 and 5, all the props 20, 17, 20 having been lifted previously. And then said ends of the belts are held in their places by the props 20, 20, which are pressed down by means of their screws 21, 21, for example.

The matrices 4 and 5 being in the position farthest from each other the hook 25 will be inserted under prop 17 and over the belt between the walls 16, 16, having its teeth turned toward the belt; and their position toward the cavities 8 and the inner edges of the two matrices 4 and 5 will now be such that, if by turning the handle 26 one presses the ends of the teeth through the belt, the edge-teeth will be bent toward the center through gliding upon the curved surfaces of the cavities 8, 8, while the ends of the inner teeth will stand closely to the inner edges of the matrices 4 and 5. After that, one turns the screw 10 so as to close the matrices 4 and 5 completely together, so as to bend the ends of the teeth quite into the surface of the belt by means of the edges of the matrices and of their cavities, as they draw nearer the center and close tightly together.

What I claim as my invention, and desire to secure by Letters Patent, is:

1. In a machine of the class described, the combination with a frame formed with guide ways, two matrices slidably mounted in the guide ways, the matrices having a series of alternately arranged projections on adjacent faces, there being grooves in the edges of the matrices to receive the said projections, each matrix having on its upper surface a series of depressions, the walls of which incline, means on the frame for holding the ends of a belt, means for driving the prongs of a connector through adjacent ends of the belt, and means for drawing the matrices toward each other to cause the walls of the depressions and the projections to clench the prongs of the connector.

2. In a machine of the class described, the combination of a frame formed with guide ways, two matrices having threaded shanks slidably mounted in the guide ways, the matrices having a series of alternately arranged projections on adjacent faces, there being grooves in the edges of the matrices to receive the projections, each matrix having a series of depressions in its upper surface and beyond the projections, the walls of the depressions being inclined, clamps for holding the ends of a belt, a plunger for driving the prongs of a connector through the ends of the belt and a right and left hand screw engaging the threaded openings in the shanks to move the matrices toward each other to clench the prongs of the connector on one side of the belt.

3. In a machine of the class described, the combination of a frame formed with guide ways, two matrices having threaded shanks slidably mounted in the guide ways, the matrices having a series of alternately arranged projections on adjacent faces there being grooves in the edges of the matrices to receive the projections, each matrix having a series of depressions in its upper surface and beyond the projections, the walls of the depressions being inclined, vertical guideways formed near each end of the frame and provided with threaded openings, clamps slidably mounted in the vertical guideways, screws engaging the threaded openings in the vertical guideways, said screws being swiveled to the clamps, a centrally disposed guideway on the frame formed with an opening, a plunger formed with a threaded opening and slidably mounted in the central guideway, a screw engaging the threaded opening in the plunger and a right and left hand threaded screw engaging the threaded openings in the shanks of the matrices.

In testimony whereof I affix my signature in presence of two witnesses.

FRANTIŠEK RYBÁŘ.

Witnesses:
ADOLPH FISCHER,
LADISLAV VOJÁŘEK.